(12) United States Patent
Huang et al.

(10) Patent No.: US 8,461,792 B2
(45) Date of Patent: Jun. 11, 2013

(54) PULSE WIDTH MODULATION FAN CONTROLLER

(75) Inventors: Chien-Jen Huang, New Taipei (TW); Hsien-Chang Chiu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 191 days.

(21) Appl. No.: 13/106,866

(22) Filed: May 13, 2011

(65) Prior Publication Data
US 2012/0223666 A1 Sep. 6, 2012

(30) Foreign Application Priority Data
Mar. 4, 2011 (CN) .......................... 2011 1 0052877

(51) Int. Cl.
*G05D 23/24* (2006.01)
*H02H 7/08* (2006.01)
*H02P 7/00* (2006.01)

(52) U.S. Cl.
USPC ........... 318/471; 318/461; 318/456; 318/472; 318/599; 370/205; 370/212; 236/49.3; 700/299; 700/300

(58) Field of Classification Search
USPC .......... 318/471, 461, 456, 472, 599; 370/205, 370/212; 236/49.3; 700/299, 300
See application file for complete search history.

(56) References Cited

U.S. PATENT DOCUMENTS

| | | | | |
|---|---|---|---|---|
| 4,814,725 | A | * | 3/1989 | Vitiello .......................... 331/1 A |
| 5,023,527 | A | * | 6/1991 | Erdman et al. ............ 318/400.34 |
| 5,942,273 | A | * | 8/1999 | Mochizuki et al. ........... 426/549 |
| 6,182,232 | B1 | * | 1/2001 | Klein ............................. 713/340 |
| 6,188,189 | B1 | * | 2/2001 | Blake ............................ 318/471 |
| 6,219,795 | B1 | * | 4/2001 | Klein ............................. 713/300 |
| 6,392,372 | B1 | * | 5/2002 | Mays, II ................... 318/400.01 |
| 7,098,617 | B1 | * | 8/2006 | Oljaca et al. .................. 318/268 |
| 7,483,270 | B2 | * | 1/2009 | Blake ........................ 361/679.48 |
| 7,489,150 | B2 | * | 2/2009 | Norris ....................... 324/750.09 |

FOREIGN PATENT DOCUMENTS

CN 101145058 A 3/2008

* cited by examiner

*Primary Examiner* — Rita Leykin
(74) *Attorney, Agent, or Firm* — Altis Law Group, Inc.

(57) ABSTRACT

A pulse width modulation (PWM) fan controller includes a sensor, a generator, a selector, and a multiplexer. The sensor is configured for sensing a current temperature of an electronic device. The generator is configured for generating different PWM signals, each of which is suitable for regulating the rotational speed of a fan for dissipating heat for the electronic device of a corresponding temperature. The selector is configured for generating a selection control signal based upon the current temperature of the electronic device. The selection control signal is used for selecting a PWM signal corresponding to the current temperature of the electronic device from the PWM signals from the generator. The multiplexer is configured for performing the selection of the PWM signal.

9 Claims, 5 Drawing Sheets

PULSE WIDTH MODULATION FAN CONTROLLER

BACKGROUND

1. Technical Field

The present disclosure relates to a pulse-width-modulation (PWM) fan controller.

2. Description of Related Art

PWM fan controllers require processing resources of computers, for example, requiring a central processing unit (CPU) of the computers to read the temperature of the computers by way of interrupts or polling. That is, the PWM fan controller shares the processing resources of the computers with other tasks/processes. Thus, the PWM fan controller may become unstable when the CPU is very busy or when deadlocks occur.

Therefore, it is desirable to provide a PWM fan controller, which can overcome the limitations described.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Embodiments of the present disclosure will now be described in detail with reference to the drawings.

Figure 1:
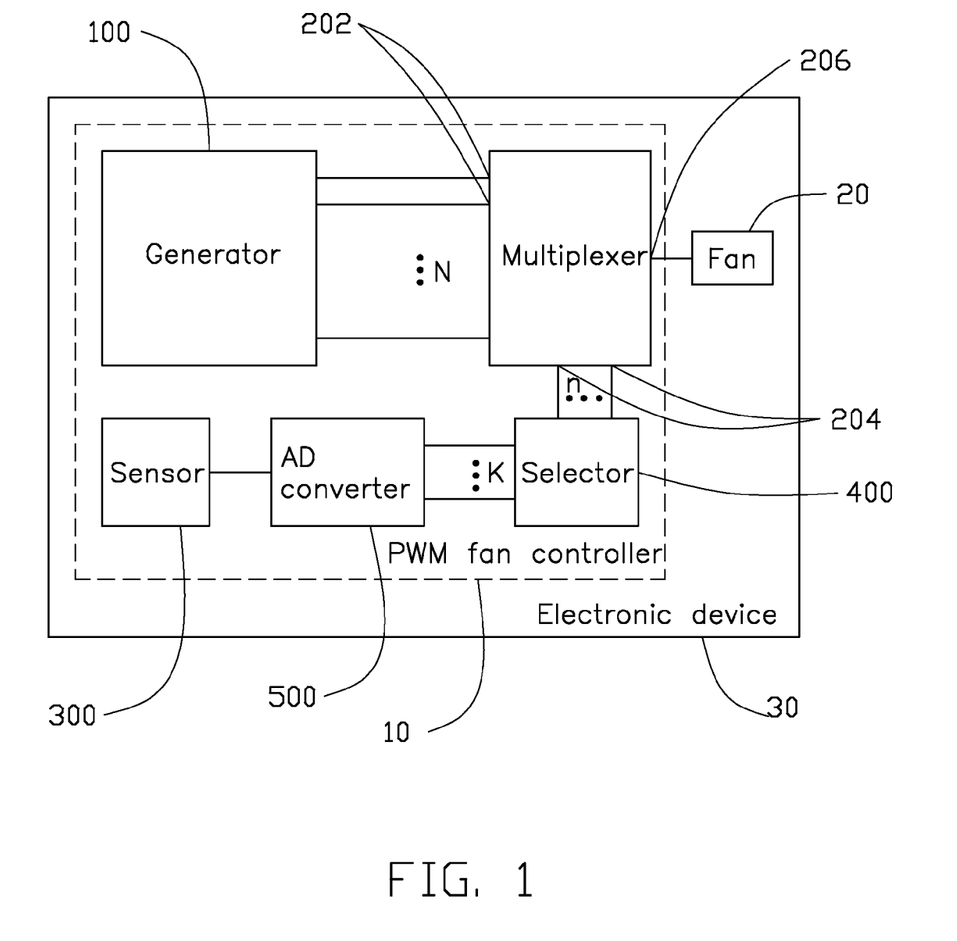
FIG. 1 is a functional block diagram of a PWM fan controller, according to an embodiment.

Referring to FIG. 1, a PWM fan controller 10, according to an embodiment, is configured for regulating rotational speed of a fan 20. The fan 20 is used for dissipating heat of an electronic device 30.

The controller 10 includes a generator 100, a multiplexer 200, a sensor 300, and a selector 400.

The sensor 300 is configured for sensing a current temperature of the electronic device 30 and generating a corresponding temperature signal.

The generator 100 is configured for generating a number of PWM signals. Each PWM signal has a unique duty cycle and is associated with a predetermined unique temperature range. Each PWM signal is configured for regulating the rotational speed of the fan 20 when the temperature of the electronic device 30 falls within the corresponding predetermined temperature range. In practice, the duty cycle of each PWM signal is set such that when the temperature of the electronic device 30 falls in the corresponding predetermined temperature range, the fan 20, of which the rotational speed is regulated by the PWM signal, can efficiently dissipate heat generated by the electronic device 30 while consuming less energy and generating less noise.

The selector 400 is connected to the sensor 300 and configured for generating a selection control signal based upon the temperature signal such that the selection control signal can be used to select a PWM signal corresponding to the current temperature of the electronic device 30 from the PWM signals generated by the generator 100.

The multiplexer 200 includes a number of multiplexer inputs 202, a multiplexer output 206, and a number of control terminals 204. The multiplexer inputs 202 are configured for receiving the respective PWM signals generated by the generator 100. The control terminals 204 are configured for receiving the selection control signal. The multiplexer 200 is configured for selecting the PWM signal corresponding to the current temperature of the electronic device 30 from the PWM signals from the multiplexer inputs 202 based upon the selection control signal from the control terminals 204 and forwarding the selected PWM signal to regulate the rotational speed of the fan 20 via the multiplexer output 206.

Thus, the controller 10 can generate different PWM signals and select the PWM signal corresponding to the current temperature of the electronic device 30, without occupying any processing resources of the electronic device 30. Thus, the controller 10 can perform more stably when the processing resources of the electronic device 30 are inadequate.

The electronic device 30 can be, for example, a computer, a gaming device, or a multimedia player. In other embodiments, the electronic device 30 can include more than one fan 20, all of which are regulated by the controller 10.

Figure 2:
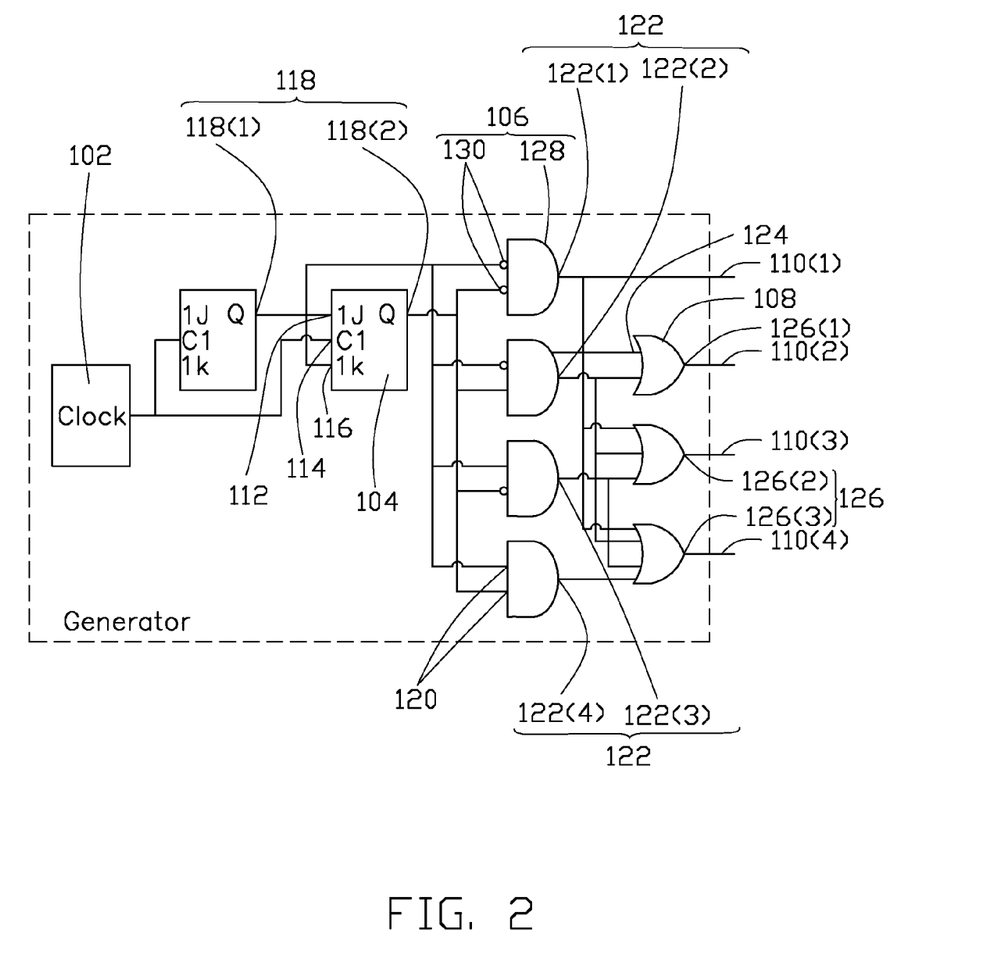
FIG. 2 is a circuit diagram of a generator of the controller of FIG. 1, according to the embodiment.

Also referring to FIG. 2, in this embodiment, the generator 200 includes a clock 102, a number of JK flip-flops 104, a number of AND gate converters 106, a number of OR gates 108, and a number of signal outputs 110. The number of the JK flip-flops 104 is n, the number of the AND gate converters 106 and the signal outputs 110 is N, and the number of the OR gates 106 is K, wherein n, N, and K are positive integers and satisfy the formula: $N=2^n=K+1$. In this embodiment, N=4, n=2, and K=3.

The signal outputs 110 are orderly arranged and configured for outputting the respective PWM signals generated by the generator 100 (see below).

Figure 3:
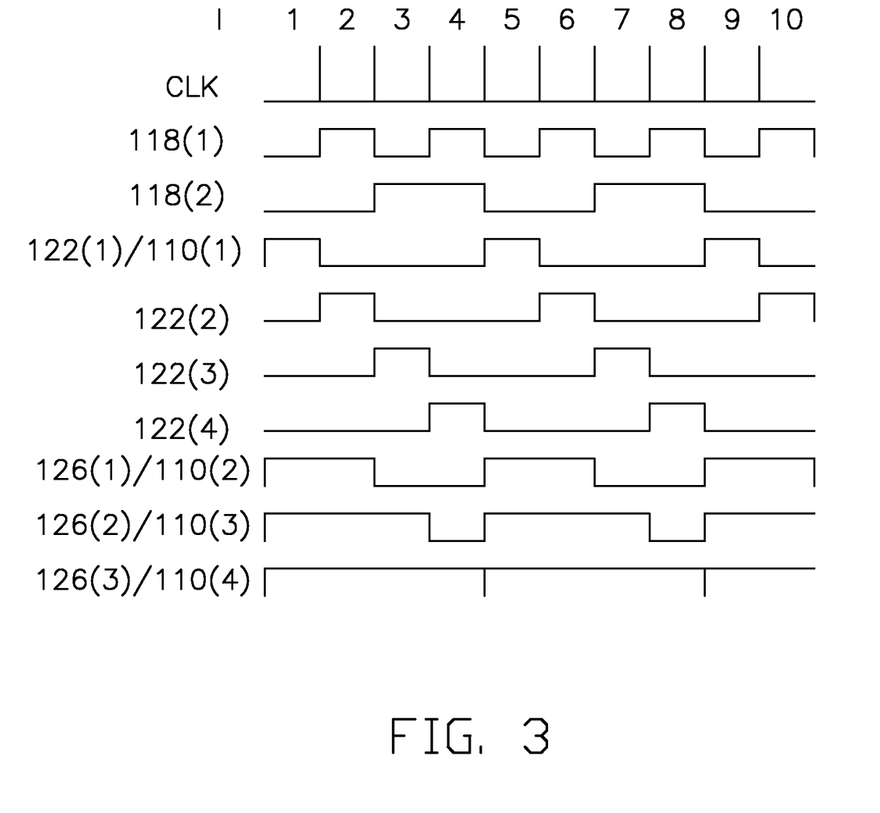
FIG. 3 is a timing chart of signals of the generator of FIG. 2, according to the embodiment.

Also referring to FIG. 3, the clock 102 is configured for generating a timing signal CLK.

Each JK flip-flop 104 includes a J input 112 (shown as "1J" in FIG. 2), a clock input 114 (shown as "C1" in FIG. 2), a K input 116 (shown as "1K" in FIG. 2), and a Q output 118. Each clock input 114 is connected to the clock 102 to receive the timing signal CLK. The JK flip-flops 104 are orderly arranged. The J input 112 and the K input 116 of a later JK flip-flop 104 are connected to the Q output 118 of a former JK flip-flop 104. The J input 112 and the K input 116 of the first JK flip-flop 104 is connected to a high logic level source (not shown) to obtain the high logic level. The JK flip-flops 104 are configured for counting the pulses of the timing signal CLK and outputting the count in a form of an n-bit binary digit via the Q outputs 118. The $i_1$-th bit of the count is output by the Q output 118 of the $i_1$-th JK flip-flop 104, where $i_1$ is a positive integer and satisfies: $i_1 \leq n$. For example, in this embodiment, the Q output 118(1) of the first JK flip-flop 104 outputs the first bit of the count. The Q output 118(2) of the second JK flip-flop 104 outputs the second bit of the count. Thus, after the first pulse of the timing signal passed, the Q output 118(1) of the first JK flip-flop 104 outputs a logic high level ("1") while the Q output 118 (2) of the second JK flip-flop 104 outputs a logic low level ("0"). That is, the count is a 2-bit binary digit "01". After the second pulse of the timing signal passed, the Q output 118(1) of the first JK flip-flop 104 outputs the logic low level while the Q output 118 (2) of the second JK flip-flop 104 outputs the logic high level. That is, the count is a 2-bit binary digit "10".

Each AND gate converter 106 includes an AND gate 128. Each AND gate 128 includes a number of AND inputs 120 and an AND output 122. The number of the AND inputs 120 of each AND gate converter 106 is n. The AND inputs 120 of each AND gate 128 are connected to the respective Q outputs 118. The AND gate converters 106 are orderly arranged. The $i_2$-th AND gate converter 106 is configured for converting the outputs of the Q outputs 118 (i.e., the count/the n-bit binary digit) into the logic high level ("1") in the time period of the Ith pulse of the timing signal CLK, wherein I=kN+$i_2$, and $i_2$, I, and k are positive integers, $i_2 \leqq N$. Thus, in this embodiment, during the time period of the (4 k+1)-th pulse (e.g., the first pulse) of the timing signal CLK, the AND output 122(1) of the first AND gate converter 106 outputs the high logic level; during the time period of the (4 k+2)-th pulse (e.g., the second pulse) of the timing signal CLK, the AND output 122(2) of the second AND gate converter 106 outputs the high logic level; during the time period of the (4 k+3)-th pulse (e.g., the third pulse) of the timing signal CLK, the AND output 122(3) of the third AND gate converter 106 outputs the high logic level; and during the time period of the 4 k-th pulse (e.g., the fourth pulse) of the timing signal CLK, the AND output 122(4) of the fourth AND gate converter 106 outputs the high logic level.

In particular, to realize the conversion, each of the first N−1 AND gate converters 106 employs at least one inverter (NOT gate) 130 in front of at least one respective AND input 120 thereof. If the AND inputs 120 employing the inverter 130 are assigned a binary digit "0" and the others are assigned a binary digit "1", the value of a n-bit binary digit consisted by the binary digits of the AND inputs 120 of the $i_2$-th AND gate converter 106 is i', wherein i'=$i_2$−1. For example, in this embodiment, the value of the 2-bit binary digit corresponding to the first AND gate converter 106 is "0" (n=2, $i_2$=1, i'=$i_2$−1=1−1=0). That is, all AND inputs 120 of the first AND gate converter 106 employ the inverter 130. The value of the 2-bit binary digit corresponding to the second AND gate converter 106 is "1" ($i_2$=2, i'=$i_2$−1=2−1=1). That is, the 2-bit binary digit corresponding to the second AND gate converter 106 is "01". The first AND input 120 of the second AND gate converter 106 employs the inverter 160 and the second AND input 120 does not.

The OR gates 108 are orderly arranged. The $i_3$-th OR gate 108 includes a number of OR inputs 124 and an OR output 126, where $i_3 \leqq k$. The number of the OR inputs 124 in the $i_3$-th OR gate 108 is j, wherein j=$i_3$+1. The OR inputs 124 of the $i_3$-th OR gate 108 are connected to the respective AND outputs 122 of the first j AND gate converters 106. Thus, in the time period of the first j pulses of every N pulses of the timing signal CLK, the OR output 126 of the $i_3$-th OR gate 108 outputs the high logic level. For example, in this embodiment, in the time period of the first two pulses of every four pulses of the timing signal CLK, the OR output 126(1) of the first OR gate 108 output the high logic level; in the time period of the first three pulses of every four pulses of the timing signal CLK, the OR output 126(2) of the second OR gate 108 outputs the high logic level; and in the time period of all pulses (i.e., the first four pulses of every four pulses) of the timing signal CLK, the OR output 126(3) of the third OR gate 108 output the high logic level.

The AND output 122(1) of the first AND gate converter 106 is connected to the first signal output 110(1)". The OR output 126 of the $i_3$-th OR gate 108 is connected to the j-th signal output 110. Thus, in the first $i_2$ pulses of every N pulses of the timing signal CLK, the $i_2$-th signal output 110 outputs the high logic level. That is, the duty cycle of the PWM signal from the $i_2$-th signal output 110 is $i_2$/N. For example, in this embodiment, in the first pulse of every four pulses of the timing signals, the first signal output 110(1) outputs the high logic level. The duty cycle of the PWM signal from the first signal output 110(1) is 25% (¼). In the first two pulses of every four pulses of the timing signals, the second signal output 110(2) outputs the high logic level. The duty cycle of the PWM signal from the second signal output 110(2) is 50% (2/4). In the first three pulses of every four pulses of the timing signals, the third signal output 110(3) outputs the high logic level. The duty cycle of the PWM signal from the third signal output 110(3) is 75% (¾). In the time period of every pulse of the timing signal CLK, the fourth signal output 110(4) output the high logic level. That is, the duty cycle of the PWM signal from the fourth signal output 110(4) is 100% (4/4).

The generator 100 is not limited to this embodiment. In other embodiments, other configurations that can generate PWM signals of different duty cycles can be employed instead.

The number of the multiplexer inputs 202 is N and the number of the control terminals 204 is n. The multiplexer inputs 202 are connected to the respective signal outputs 110. Each of the multiplexer inputs 202 has an address in a form of an n-bit binary digit. The selection control signal is also an n-bit binary digit. The bits of the selection control signal are sent to the respective control terminals 204. The multiplexer 200 is configured to connect a multiplexer input 202, of which the address is identical to the selection control signal from the control terminals 204, to the multiplexer output 206, thus selecting the PWM signal corresponding to the selection control signal.

Figure 4:
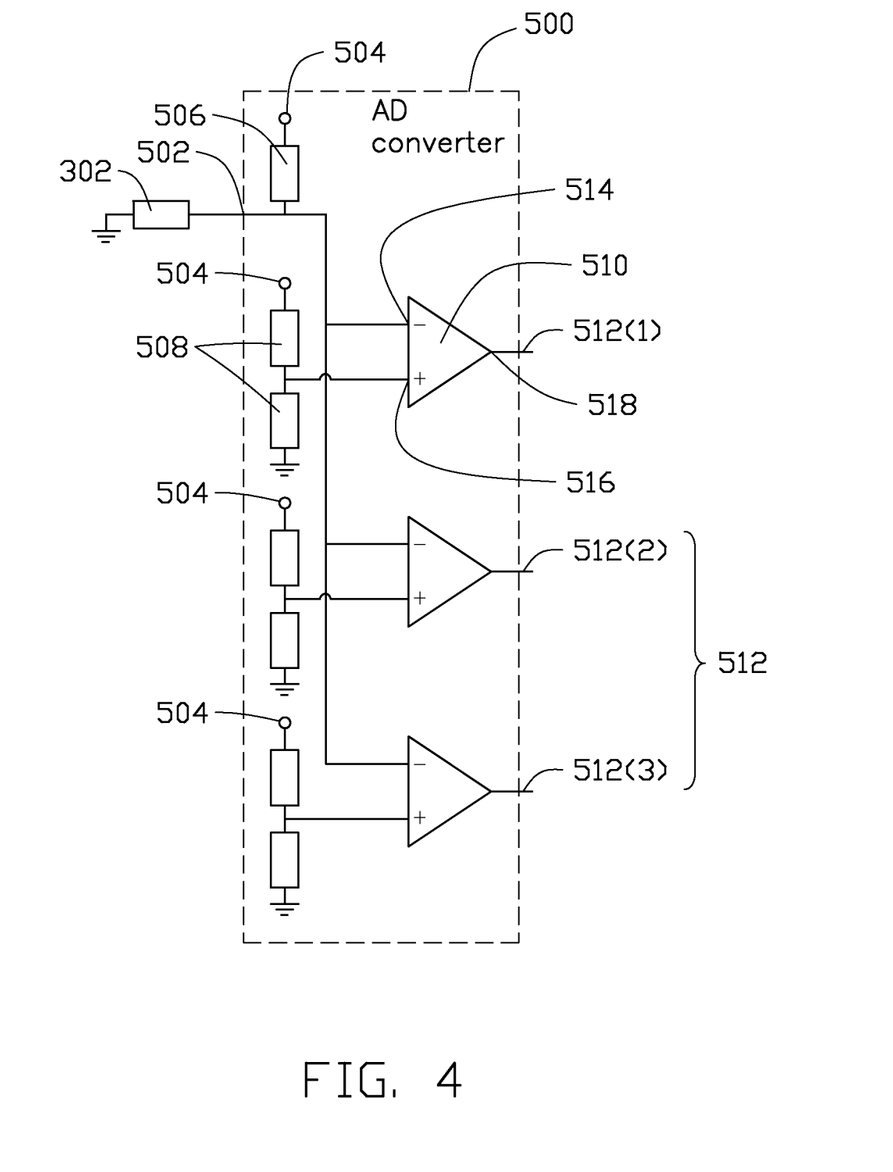
FIG. 4 is a circuit diagram of an analog-to-digital (AD) converter of the controller of FIG. 1, according to the embodiment.

Also referring to FIG. 4, the sensor 300 can include a thermistor 302. The temperature signal is the resistance of the thermistor 302.

In this embodiment, the controller 10 also includes an AD converter 500 (see FIG. 1), that is configured for converting the temperature signal into a digital signal in a form of a K-bit binary digit, which is processible by the selector 400. The AD converter includes an AD input 502, a power source 504, a resistor 506, and a number of resistor groups 508, a number of comparators 510, and a number of AD outputs 512. The number of the resistor groups 508, the comparators 510, and the AD outputs 512 is K. The resistor groups 508, the comparators 510, and the AD outputs 512 are orderly arranged. The thermistor 502 is connected between the AD input and ground. The resistor 506 is connected between the AD input and the power source 504. The resistor groups 508 are connected between the power source 504 and ground and configured for outputting a number of predetermined reference voltages. The predetermined reference voltage of a latter resistor group 508 is greater than that of a former resistor group 508. Each comparator 510 includes a negative input 514, a positive input 516, and a comparator output 518. The AD input 502 is connected to the negative inputs 514. The reference voltages are sent to the respective positive inputs 516. The comparator outputs 518 are connected to the respective AD outputs 512. Thus, the higher the current temperature of the electronic device 30 is, the higher the input of the native inputs 514 is. The comparator outputs 518 output the logic high level "1" when the input of the negative inputs 514 is higher than the corresponding reference voltage from the corresponding positive input 516. The thermistor 302, the resistor 506, and the resistor groups 508 cooperatively define the predetermined unique temperature ranges. In this embodiment, the thermistor 302, the resistor 506, and the resistor groups 508 are set such that the AD converter 500 satisfies Table 1:

TABLE 1

| temperature of the electronic device 30 | output of the third AD output 512(3)) | output of the second AD output 512(2)) | output of the first AD output 512(1)) |
|---|---|---|---|
| <25° C. | 0 | 0 | 0 |
| 25~40° C. | 0 | 0 | 1 |
| 40~65° C. | 0 | 1 | 1 |
| >65° C. | 1 | 1 | 1 |

Obviously, the number of the values of the digital signal is K.

Figure 5:
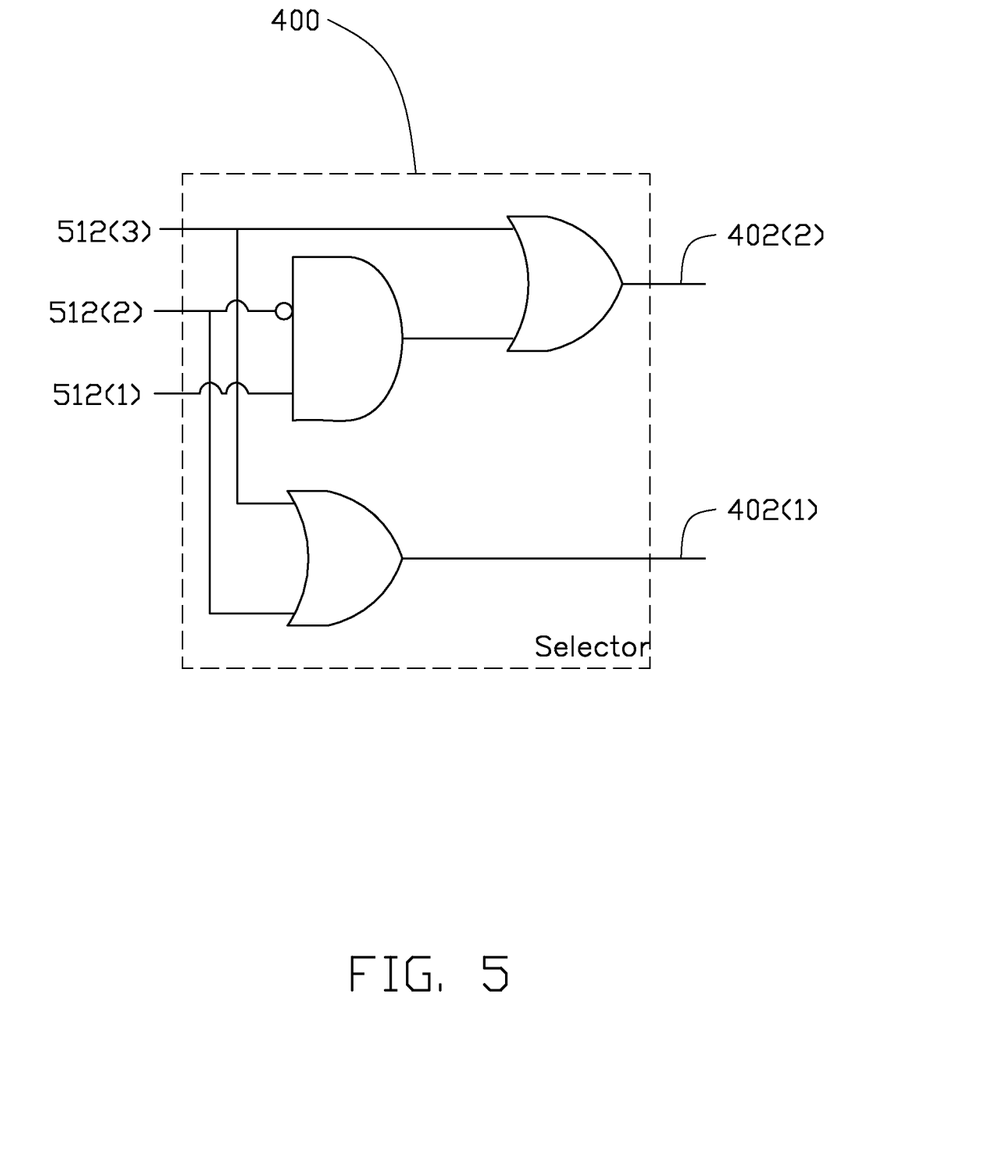
FIG. 5 is a circuit diagram of a selector of the controller of FIG. 1, according to the embodiment.

The selector 400 is configured for encoding the digital signal into the selection control signal. In particular, the selector 400 can be a logic circuit designed based upon the characteristics of the AD converter 500 and the multiplexer 200 (e.g., Table 1 and the address of the multiplexer inputs 202) by analysis tools such as Karnaugh maps. In this embodiment, the selector 400 can be the logic circuit shown in FIG. 5.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the scope of the disclosure but do not restrict the scope of the disclosure.

What is claimed is:

1. A pulse width modulation (PWM) fan controller for an electronic device, comprising:
   a sensor configured for sensing a current temperature of the electronic device and generating a corresponding temperature signal;
   a generator configured for generating a plurality of PWM signals, each PWM signal having a unique duty cycle and is associated with a predetermined unique temperature range, the PWM signals configured for regulating rotational speed of a fan of the electronic device when the temperature of the electronic device falls within a corresponding predetermined unique temperature range such that the fan dissipates heat generated by the electronic device;
   a selector connected to the sensor and configured for converting the temperature signal into a selection control signal, the selection control signal being configured for select a PWM signal corresponding to the current temperature of the electronic device from the PWM signals generated by the generator; and
   a multiplexer connected to the generator and the selector, the multiplexer being configured for receiving the PWM signals from the generator, selecting the PWM signal corresponding to the current temperature of the electronic device based upon the selection control signal, and forwarding the PWM signal corresponding to the current temperature of the electronic device to regulate the rotational speed of the fan;
   wherein the sensor comprises a thermistor;
   wherein the PWM fan controller further comprises an AD converter configured for converting the temperature signal into a digital signal, which is processible by the selector;
   wherein the AD converter comprises an AD input, a power source, a resistor, and a plurality of resistor groups, a plurality of comparators, and a plurality of AD outputs, the number of the resistor groups, the comparators, and the AD outputs is K, wherein $K=2^n-1=N-1$, the resistor groups, the comparators, and the AD outputs are orderly arranged, the thermistor is connected between the AD input and ground, the resistor is connected between the AD input and the power source, the resistor groups are connected between the power source and ground and configured for outputting a plurality of predetermined reference voltages, the predetermined reference voltage of a latter resistor group is higher than that of a former resistor group, the thermistor, the resistor, and the resistor groups cooperatively define the predetermined unique temperature ranges, each comparator comprises a negative input, a positive input, and a comparator output, the AD input is connected to the negative inputs, the reference voltages are sent to the respective positive inputs, the comparator outputs are connected to the respective AD outputs.

2. The PWM fan controller of claim 1, wherein the electronic device is selected from the group consisting of a computer, a gaming device, and a multimedia player.

3. The PWM fan controller of claim 1, wherein the generator comprises a clock, a plurality of JK flip-flops, a plurality of AND gate converters, a plurality of OR gates, and a plurality of signal outputs, the number of the JK flip-flops is n, the number of the AND gate converters and the signal outputs 110 is N, and the number of the OR gates is K, wherein n, N, and K are positive integers and satisfy the formula: $N=2^n=K+1$, the signal outputs are orderly arranged and configured for outputting the respective PWM signals generated by the generator, the clock is configured for generating a timing signal, each JK flip-flop comprises a J input, a clock input, a K input, and a Q output, each clock input is connected to the clock to receive the timing signal, the JK flip-flops are orderly arranged, the J input and the K input of a later JK flip-flop are connected to the Q output of a former JK flip-flop, the JK flip-flops are configured for counting pulses of the timing signal CLK and outputting the count in a form of an n-bit binary digit via the Q outputs, the $i_1$-th bit of the count is output by the Q output of the $i_1$-th JK flip-flop, wherein $i_1$ is a positive integer and satisfies $i_1 \leq n$, each AND gate converter comprises an AND gate, each AND gate comprises a plurality of AND inputs and an AND output, the number of the AND inputs of each AND gate converter 106 is n, the AND inputs of each AND gate are connected to the respective Q outputs, the AND gate converters are orderly arranged, the $i_2$-th AND gate converter is configured for converting the outputs of the Q outputs into the logic high level in the time period of the Ith pulse of the timing signal, wherein $I=kN+i_2$, and $i_2$, I, and k are positive integers, $i_2 \leq N$, the OR gates are orderly arranged, the $i_3$-th OR gate comprises a plurality of OR inputs and an OR output, wherein $i_3 \leq k$, the number of the OR inputs in the $i_3$-th OR gate is j, wherein $j=i_3+1$, the OR inputs of the $i_3$-th OR gate are connected to the respective AND outputs of the first j AND gate converters, the AND output of the first AND gate converter is connected to the first signal output, the OR output of the ith OR gate is connected to the j-th signal output.

4. The PWM fan controller of claim 3, wherein each of the first N-1 AND gate converters employs at least one inverter in front of at least one respective AND input thereof, if the AND inputs employing the inverter are assigned with a binary digit "0" and the others are assigned with a binary digit "1", the value of a n-bit binary digit consisted by the binary digits of the AND inputs of the $i_2$-th AND gate converter is i', wherein $i'=i_2-1$.

5. The PWM fan controller of claim 1, wherein the number of the PWM signals is N, wherein N is a positive integer, the multiplexer comprises a plurality of multiplexer inputs, a plurality of control terminals, and a multiplexer output, the number of the multiplexer inputs is N and the number of the control terminals is n, wherein N=2ⁿ, the multiplexer inputs are connected to the respective signal outputs, each of the multiplexer inputs has an address in a form of an n-bit binary digit, the selection control signal is also a n-bit binary digit, the bits of the selection control signal are sent to the respective control terminals, the multiplexer is configured for connect a multiplexer input, of which the address is identical to the selection control signal from the control terminals, to the multiplexer output.

6. The PWM fan controller of claim 1, wherein K=3, the thermistor, the resistor, and the resistor groups are set such that the AD converter satisfies the following table:

| temperature of the electronic device | output of the third AD output | output of the second AD output | output of the first AD output |
|---|---|---|---|
| <25° C. | 0 | 0 | 0 |
| 25~40° C. | 0 | 0 | 1 |
| 40~65° C. | 0 | 1 | 1 |
| >65° C. | 1 | 1 | 1 |

7. A pulse width modulation (PWM) fan controller for an electronic device, comprising:
a sensor configured for sensing a current temperature of the electronic device and generating a corresponding temperature signal;
a generator configured for generating a plurality of PWM signals, each PWM signal having a unique duty cycle and is associated with a predetermined unique temperature range, the PWM signals configured for regulating rotational speed of a fan of the electronic device when the temperature of the electronic device falls within a corresponding predetermined unique temperature range such that the fan dissipates heat generated by the electronic device;
a selector connected to the sensor and configured for converting the temperature signal into a selection control signal, the selection control signal being configured for select a PWM signal corresponding to the current temperature of the electronic device from the PWM signals generated by the generator; and
a multiplexer connected to the generator and the selector, the multiplexer being configured for receiving the PWM signals from the generator, selecting the PWM signal corresponding to the current temperature of the electronic device based upon the selection control signal, and forwarding the PWM signal corresponding to the current temperature of the electronic device to regulate the rotational speed of the fan;
wherein the generator comprises a clock, a plurality of JK flip-flops, a plurality of AND gate converters, a plurality of OR gates, and a plurality of signal outputs, the number of the JK flip-flops is n, the number of the AND gate converters and the signal outputs 110 is N, and the number of the OR gates is K, wherein n, N, and K are positive integers and satisfy the formula: N=2ⁿ=K+1, the signal outputs are orderly arranged and configured for outputting the respective PWM signals generated by the generator, the clock is configured for generating a timing signal, each JK flip-flop comprises a J input, a clock input, a K input, and a Q output, each clock input is connected to the clock to receive the timing signal, the JK flip-flops are orderly arranged, the J input and the K input of a later JK flip-flop are connected to the Q output of a former JK flip-flop, the JK flip-flops are configured for counting pulses of the timing signal CLK and outputting the count in a form of an n-bit binary digit via the Q outputs, the $i_1$-th bit of the count is output by the Q output of the $i_1$-th JK flip-flop, wherein $i_1$ is a positive integer and satisfies $i_1 \leq n$, each AND gate converter comprises an AND gate, each AND gate comprises a plurality of AND inputs and an AND output, the number of the AND inputs of each AND gate converter 106 is n, the AND inputs of each AND gate are connected to the respective Q outputs, the AND gate converters are orderly arranged, the $i_2$-th AND gate converter is configured for converting the outputs of the Q outputs into the logic high level in the time period of the Ith pulse of the timing signal, wherein I=kN+$i_2$, and $i_2$, I, and k are positive integers, $i_2 \leq N$, the OR gates are orderly arranged, the $i_3$-th OR gate comprises a plurality of OR inputs and an OR output, wherein $i_3 \leq k$, the number of the OR inputs in the $i_3$-th OR gate is j, wherein j=$i_3$+1, the OR inputs of the $i_3$-th OR gate are connected to the respective AND outputs of the first j AND gate converters, the AND output of the first AND gate converter is connected to the first signal output, the OR output of the ith OR gate is connected to the j-th signal output.

8. The PWM fan controller of claim 7, wherein each of the first N−1 AND gate converters employs at least one inverter in front of at least one respective AND input thereof, if the AND inputs employing the inverter are assigned with a binary digit "0" and the others are assigned with a binary digit "1", the value of a n-bit binary digit consisted by the binary digits of the AND inputs of the $i_2$-th AND gate converter is i', wherein i'=$i_2$−1.

9. A pulse width modulation (PWM) fan controller for an electronic device, comprising:
a sensor configured for sensing a current temperature of the electronic device and generating a corresponding temperature signal;
a generator configured for generating a plurality of PWM signals, each PWM signal having a unique duty cycle and is associated with a predetermined unique temperature range, the PWM signals configured for regulating rotational speed of a fan of the electronic device when the temperature of the electronic device falls within a corresponding predetermined unique temperature range such that the fan dissipates heat generated by the electronic device;
a selector connected to the sensor and configured for converting the temperature signal into a selection control signal, the selection control signal being configured for select a PWM signal corresponding to the current temperature of the electronic device from the PWM signals generated by the generator; and
a multiplexer connected to the generator and the selector, the multiplexer being configured for receiving the PWM signals from the generator, selecting the PWM signal corresponding to the current temperature of the electronic device based upon the selection control signal, and forwarding the PWM signal corresponding to the current temperature of the electronic device to regulate the rotational speed of the fan;
wherein the number of the PWM signals is N, wherein N is a positive integer, the multiplexer comprises a plurality of multiplexer inputs, a plurality of control terminals, and a multiplexer output, the number of the multiplexer inputs is N and the number of the control terminals is n, wherein N=2ⁿ, the multiplexer inputs are connected to the respective signal outputs, each of the multiplexer inputs has an address in a form of an n-bit binary digit, the selection control signal is also a n-bit binary digit, the bits of the selection control signal are sent to the respective control terminals, the multiplexer is configured for connect a multiplexer input, of which the address is identical to the selection control signal from the control terminals, to the multiplexer output.

* * * * *